United States Patent [19]

Vollmann

[11] Patent Number: 5,454,529
[45] Date of Patent: Oct. 3, 1995

[54] CASSETTE PROVIDED WITH MAGNETIC TAPE

[75] Inventor: Norbert C. Vollmann, Eindhoven, Netherlands

[73] Assignee: U.S. Philips Corporation, New York, N.Y.

[21] Appl. No.: 274,659

[22] Filed: Jul. 13, 1994

Related U.S. Application Data

[63] Continuation of Ser. No. 985,527, Dec. 3, 1992, abandoned, which is a continuation of Ser. No. 703,544, May 21, 1991, abandoned.

[30] Foreign Application Priority Data

Oct. 11, 1990 [AT] Austria ................................. 2049/90
Feb. 20, 1991 [NL] Netherlands ....................... 9100295

[51] Int. Cl.⁶ .................................................... G11B 23/087
[52] U.S. Cl. ................................................... 242/347.1
[58] Field of Search ............................ 242/197, 198, 242/199, 200, 347.1; 360/132; 206/387, 389

[56] References Cited

U.S. PATENT DOCUMENTS

| | | | |
|---|---|---|---|
| 4,497,008 | 1/1985 | Schoenmakers | 360/132 |
| 4,614,270 | 9/1986 | Oishi | 242/199 |
| 4,618,903 | 10/1986 | Oishi et al. | 360/132 |
| 5,022,520 | 6/1991 | Yeol et al. | 242/199 X |
| 5,161,079 | 11/1992 | Ohshima et al. | 360/132 |
| 5,214,554 | 5/1993 | Vollmann et al. | 242/347.1 |
| 5,372,320 | 12/1994 | Watanabe et al. | 242/347.1 |

FOREIGN PATENT DOCUMENTS

| | | | |
|---|---|---|---|
| 0162487 | 11/1985 | European Pat. Off. | 360/132 |
| 2058261 | 8/1971 | Germany | 242/199 |
| 2136913 | 2/1972 | Germany | 242/199 |

*Primary Examiner*—John P. Darling
*Attorney, Agent, or Firm*—Brian J. Wieghaus

[57] ABSTRACT

A cassette comprises a housing provided with magnetic tape and having two pressure-roller openings and one magnetic-head opening. The cassette also comprises a sliding cover for covering the openings in the housing, which sliding cover is movable between a closed position and an open position. The thickness (t2) of the cassette is 9.6 millimeters. This results in a more rigid construction of the sliding cover.

19 Claims, 3 Drawing Sheets

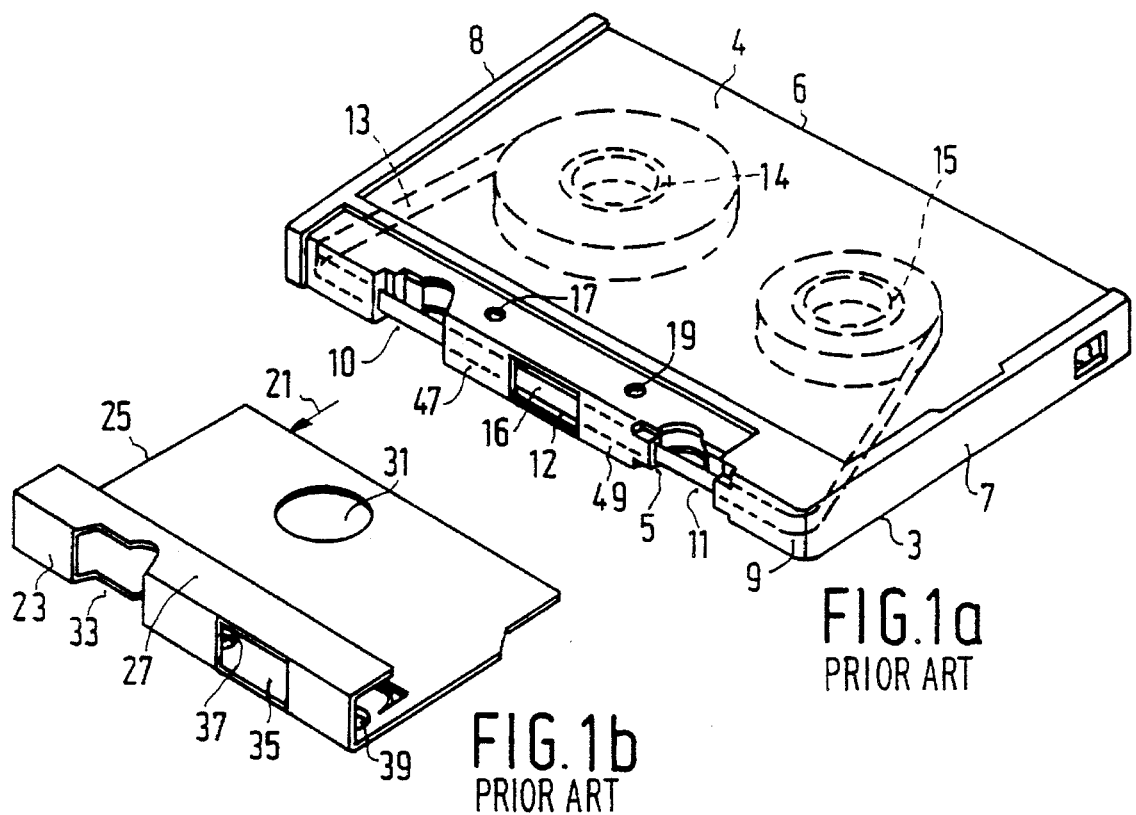
FIG.1a PRIOR ART
FIG.1b PRIOR ART
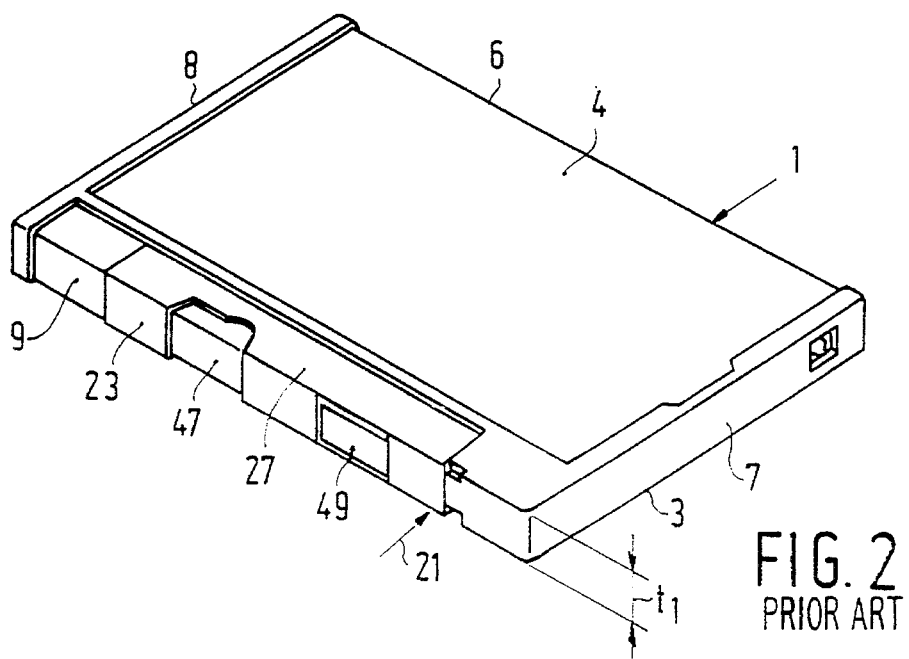
FIG. 2 PRIOR ART

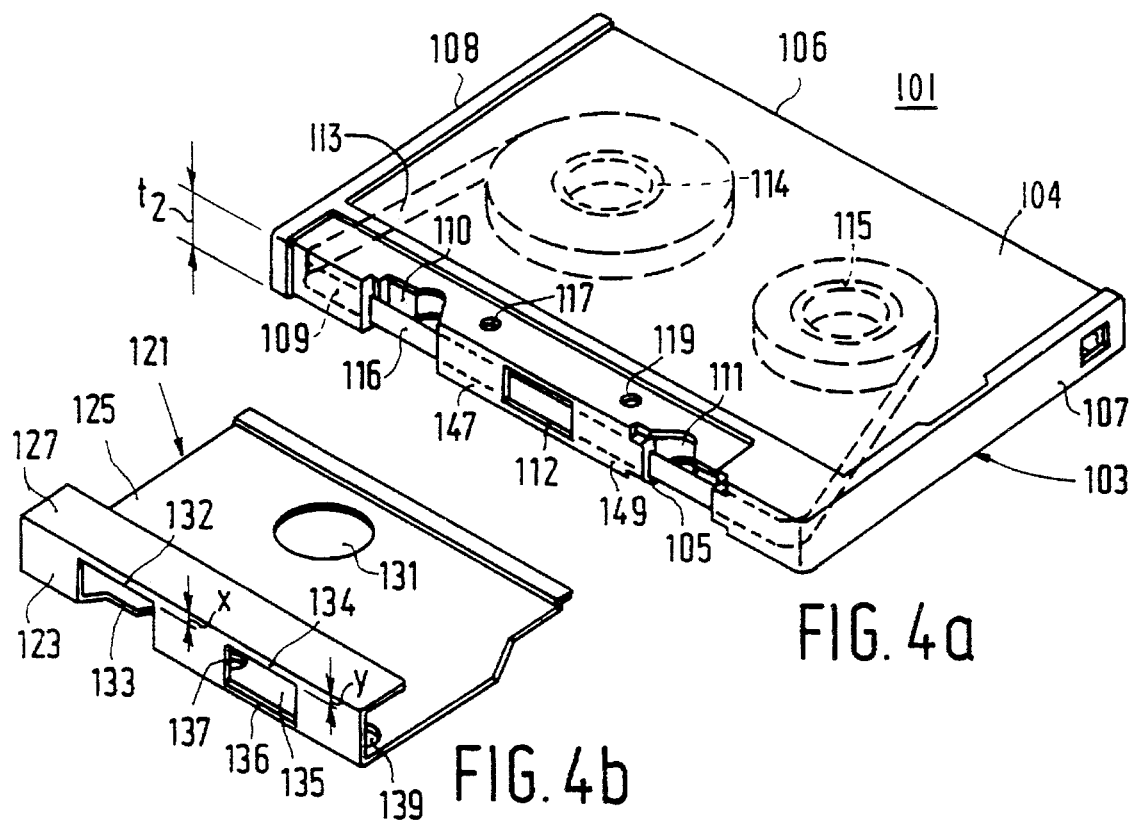
FIG. 4a
FIG. 4b
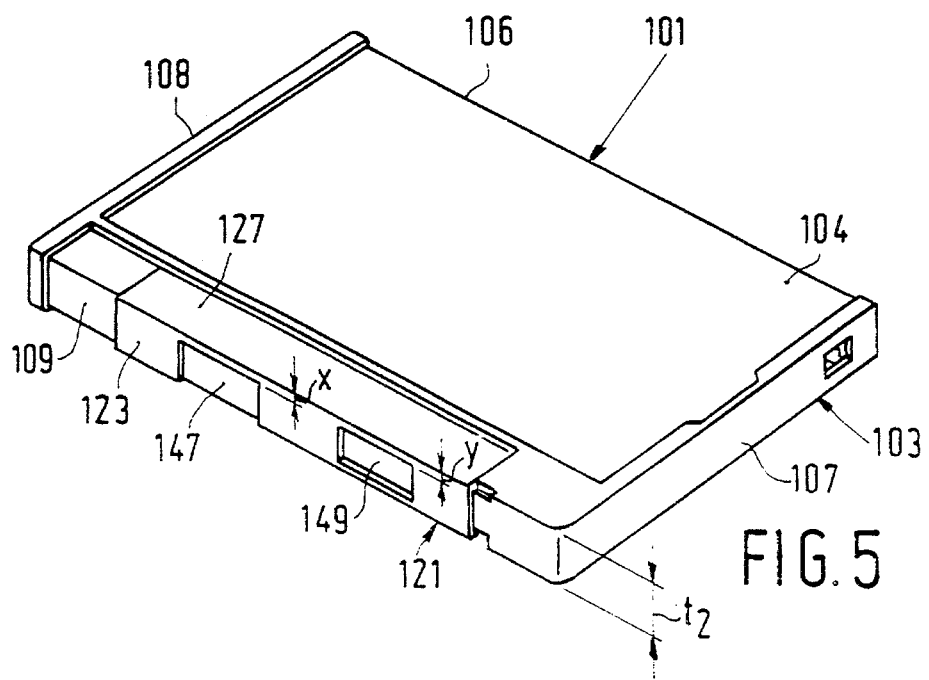
FIG. 5

CASSETTE PROVIDED WITH MAGNETIC TAPE

This is a continuation of application Ser. No. 07/985,527, filed on Dec. 3, 1992, now abandoned, which is a continuation of prior application Ser. No. 07/703,544, filed on May 21, 1991, now abandoned.

BACKGROUND OF THE INVENTION

The invention relates to a cassette provided with magnetic tape and comprising a housing having two parallel main walls interconnected by transverse walls, of which one transverse wall constitutes a cassette front wall having two pressure-roller openings and one magnetic-head opening; a sliding cover which comprises a front portion situated near the front wall and extending parallel thereto, main portions adjoining the front portion and overlying the main walls of the housing, and a pressure-roller aperture and a magnetic-head aperture, which sliding cover is movable between a closed position and an open position and covers the openings in the housing in the closed position and exposes the openings in the open position, which cassette has a thickness in a direction perpendicular to the main walls.

A cassette of the type defined in the opening paragraph is described in the non-prepublished Dutch Patent Application filed under number 9000348 (=attorneys Docket No. PHN 13,235) herein incorporated by reference. Said Application describes a system comprising said cassette and an apparatus for recording and/or reproducing digital audio signals on/from the magnetic tape in the cassette. This system aims at replacing the well-known Compact Cassette system according to which signals are read and written in analog form on the magnetic tape in conformity with the internal standard IEC 94-7. The proposed cassettes and apparatuses of the digital system are largely identical, at least mechanically, to those of the Compact Cassette system to enable the apparatuses of the digital system to play-back the analog Compact Cassettes.

The cassette of the digital system is a modification of the Compact Cassette. The most important modifications concern the omission of the thickened part which is present at the open side of the Compact Cassette and the presence of a sliding cover to close the open side. The tape transport in the apparatuses is effected by means of a capstan and a pressure roller which presses the magnetic tape against the capstan. As the mechanical part of an apparatus of the digital system is substantially the same as that of the Compact Cassette system the housing of the digital cassette should have substantially the same dimensions, apart from the thickened part of the Compact Cassette, and should have a similar space for cooperation with a pressure roller as the Compact Cassette System. As the dimension of the pressure-roller opening in the well-known Compact Cassette in a direction perpendicular to the main walls is larger than the thickness of remaining part of the housing (8.6 millimeter) and therefore also of the described digital cassette, and one of the main walls of both cassettes cooperates with a similar surface in the apparatus, the pressure-roller openings in the housing of said digital cassette and the pressure-roller aperture in the sliding cover should extend into both main walls of the housing and into both main portions of the sliding cover, respectively. Pressure-roller openings in the housing and the pressure-roller aperture in the sliding cover extending into the main walls and main portions weaken the housing and the sliding cover, respectively. This increases the likelihood of deformation of the housing and of the sliding cover during use, and hence the likelihood of the sliding cover being canted relative to the housing, which may render the cassette unserviceable.

OBJECTS AND SUMMARY OF THE INVENTION

It is an object of the invention to provide a rugged cassette of the type defined in the opening paragraph, which in comparison with the described cassette is less likely to suffer deformation of the housing and canting of the sliding cover relative to the housing. To this end, the cassette in accordance with the invention is characterized in that the thickness is at least 9.5 millimeters. In spite of the fact that such a thickness renders the cassette of the invention thicker than the Compact Cassette (apart from the said thickened part of the Compact Cassette), the desired interchangeability of cassettes remains intact. Since the cassette is thicker the walls of the housing can be thicker, which strengthens the cassette. Assuming that the sections of the sliding cover have a thickness of 0.4 millimeters, it follows that for a cassette thickness of at least 9.5 millimeters, the pressure-roller aperture need not extend into one of the main portions of the sliding cover, in order to provide enough room for the passage of a pressure roller. Thus, the cassette in accordance with the invention enables a more rigid construction for the sliding cover to minimize the risk of canting. This will be explained in greater detail hereinafter with reference to the Figures.

An embodiment of the cassette in accordance with the invention is characterized in that the thickness is at least substantially 9.6 millimeters. This ensures that under all circumstances there is a clearance between the main portion of the sliding cover and the pressure roller, so that the production tolerances can be less stringent, which has a cost-reducing effect. By making the thickness only slightly larger than the required 9.5 millimeters, the cassette dimensions remain minimal, which is desirable for use in a magnetic-tape apparatus.

A further embodiment of the cassette in accordance with the invention, in which the first main wall of the housing is substantially imperforate, is characterized in that the first main portion of the sliding cover which overlies the first main wall of the housing has no apertures. As stated hereinbefore, this results in a more rigid sliding cover, which reduces the risk of canting of the sliding cover.

Another embodiment of the cassette in accordance with the invention is characterized in that a wall portion of the front portion of the sliding cover is situated between the pressure-roller aperture and the first main portion of the sliding cover. As the dimension of the pressure roller in a direction perpendicular to the main walls of the cassette is generally smaller than the corresponding dimension of the pressure-roller opening in the Compact Cassette, the space for the passage of a pressure roller in the sliding cover can be chosen smaller, so that the front portion of the sliding cover near the pressure-roller aperture can comprise a wall portion, which additionally strengthens the sliding cover. This in effect provides a stiffening strip extending across the front wall portion of the sliding cover between the magnetic head access and pressure roller openings and the first main, imperforate wall portion of the sliding cover.

Yet another embodiment of the cassette in accordance with the invention is characterized in that further wall portions are situated between the magnetic-head aperture and the main portions of the sliding cover. As the dimension of a magnetic head in a direction perpendicular to the main walls of the cassette in an apparatus belonging to the digital system is smaller than the corresponding dimension of a magnetic head of an apparatus belonging to the Compact Cassette system, the magnetic-head aperture in the sliding cover can be smaller, so that the front portion of the sliding cover can also comprise wall portions near the magnetic-head aperture, which results in a further reinforcement of the sliding cover.

BRIEF DESCRIPTION OF THE DRAWING

An embodiment of the cassette in accordance with the invention will now be described in more detail, by way of example, with reference to the drawings. In the drawings:

FIG. 1a is a perspective plan view of a housing of a cassette of the prior art,

FIG. 1b is a perspective view of a sliding cover belonging to the cassette of FIG. 1a, FIG. 2 is a perspective view of the cassette shown in FIG. 1a, but with the sliding cover of FIG. 1b mounted on the housing, FIG. 4a is a perspective plan view of a housing of a cassette in accordance with the invention, FIG. 4b is a perspective view of a sliding cover belonging to the cassette in accordance with the invention, and FIG. 5 is a perspective view of the cassette shown in FIG. 4a, but now with the sliding cover of FIG. 4b mounted on the housing.

DESCRIPTION OF THE PREFERRED EMBODIMENTS

Figure 3:
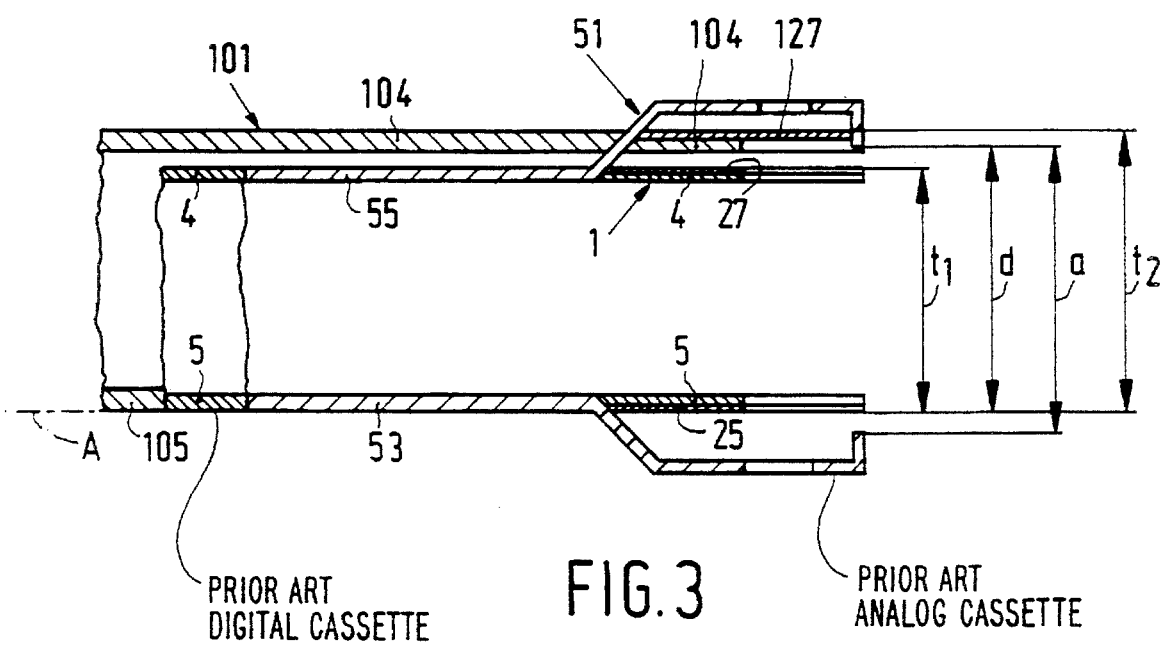
FIG. 3 shows sectional views of a portion of the prior-art cassette of FIG. 2, and of a similar portion of a cassette in accordance with the invention, projected onto each other.

FIGS. 1 to 5 have been drawn to an arbitrary scale, which is not always the same. FIG. 1a shows an example of the already introduced digital cassette, which has a housing 3 with two parallel main walls 4, 5 and various transverse walls 6, 7, 8, 9. The transverse wall 9 forms a front wall with pressure-roller openings 10, 11 and a magnetic-head opening 12. The housing 3 accommodates a magnetic tape 13 wound on reels 14 and 15, a part 16 of this tape extending across openings 10, 11 and 12 in the front wall 9. The main wall 4 is substantially imperforate except near the front wall 9, where it has locating apertures 17, 19, pressure-roller openings and a magnetic-head opening, extending into the main walls, for the passage of pressure rollers and capstans during cooperation with an apparatus such as a player/recorder. The openings can be covered by means of a sliding cover 21 shown in FIG. 1b. For this purpose, the sliding cover 21 comprises a front portion 23 extending parallel to the front wall 9 and two main portions 25, 27 extending parallel to the main walls 4, 5.

In a closed position, the sliding cover covers the openings in the housing 3 (FIG. 2). In an open position (not shown), apertures 31, 33, 35, 37 and 39 in the sliding cover 21 expose the openings in the housing. FIG. 2 shows the cassette 1 with the sliding cover 21 mounted on the housing 3. In its closed position, the apertures 33 and 35 are situated opposite imperforate wall portions 47 and 49 of the front wall 9 and the front portion 23 covers the openings 10, 11 and 12 in the front wall 9 of the housing 3. The described cassette 1 has a thickness t1 of approximately 8.6 millimeters.

As already stated, the apparatuses of the proposed digital system are designed to be "backwards compatible with", that is, largely the same, at least mechanically, as those of able to play cassettes from the known Compact Cassette system as well as the new digital cassettes. For this reason the cassettes belonging to the digital system should provide the same room for cooperation with a pressure roller as the cassettes belonging to the Compact Cassette system. For this purpose, FIG. 3 shows sectional views of different cassettes at the location of the pressure-roller openings. The dimension a of the pressure-roller opening in the known Compact Cassette 51 in a direction perpendicular to the mains walls 53 and 55 is 9.6 millimeters and, consequently, larger than the thickness t1 of the described digital cassette 1. Main wails 5 and 53 of both cassettes 1 and 51 respectively cooperate with a surface A of the apparatus, the pressure-roller apertures in the housing of cassette 1 extend into two main wails 4, 5 and the pressure-roller opening in its sliding cover extend into the two main portions 25, 27 respectively. As a result of this, the main wails 4, 5 and the main portions 25, 27 of the cassette 1 do not obstruct a pressure roller of a maximal dimension a in a direction perpendicular to the main wails.

In the present example, the cassette 101 in accordance with the invention has a thickness t2 of 9.6 millimeters. The main portion 127 of the sliding cover of this cassette has no apertures. Since the distance d from the surface A to the boundary of the opening in the Compact Cassette 51 is only 9.1 millimeters and the main portion of the sliding cover of the cassette 101 has a thickness of 0.4 millimeters, there is enough room to accommodate a pressure roller of a dimension a. Moreover, the main walls 104 and 105 of the housing of the cassette 101 are thicker than those of the housing of the cassette 1. Owing to this and also to the imperforate main portion 127 of the sliding cover, the cassette 101 in accordance with the invention is more rigid than the described cassette 1.

FIG. 4a shows a housing 103 of an embodiment of the cassette 101 in accordance with the invention. The housing 103 has main walls 104, 105 and transverse walls 106, 107, 108, 109. The transverse wail 109 is a front wall with pressure-roller openings 110, 111 and a magnetic-head opening 112. The cassette 101 has a thickness t2 of approximately 9.6 millimeters. The housing 103 accommodates a magnetic tape 113 wound on reels 114 and 115, which surround respective drive spindle openings in the lower wall 103 which receive reel drive spindles of a magnetic tape apparatus. The main wall 104 has locating apertures 117, 119 and the pressure-roller openings and the magnetic-head opening, which extend into the main walls. The openings can be covered by means of a sliding cover 121 shown in FIG. 4b. For this purpose the sliding cover 121 comprises a front portion 123 and two main portions 125, 127, which cover the openings in a closed position of the sliding cover (FIG. 5). The main portion 127 has no apertures, so that the sliding cover 121 is more rigid than the sliding cover 121 of the cassette 1 described hereinbefore. The front portion 123 has a wall portion 132 or stiffening strip, which bounds the pressure-roller aperture 133, so that the pressure-roller aperture 133 is situated at a distance x from the main portion 127, which makes the sliding cover even more rigid. This distance x is maximum 0.5 millimeters, which is the difference between the thickness t2 and the dimension d, see FIG. 3. The front portion 123 further comprises wall portions 134 and 136 bounding the magnetic-head opening 135, so that the magnetic-head aperture 135 is situated at a distance y from the main portions 125 and 127 and the sliding cover becomes even more rigid. With the wall portions 132 and 134, the front wall portion includes a stiffening rib, extending adjacent the imperforate portion 127, with a width x over the length of the sliding cover. The maximum value for the distance y is dictated by the minimum dimension laid down for the magnetic-head opening 135. In the present embodiment the distance y is equal to the distance x. In an open position (not shown) of the sliding cover, the apertures 131,133, 135, 137 and 139 in the sliding cover 121 expose the openings in the housing. FIG. 5 shows the cassette 101 with the sliding cover 121 mounted on the housing 103 in the closed position. The front portion 123 covers the openings 110, 111 and 112 in the front wall 109 of the housing 103. In the closed position the apertures 133 and 135 are situated opposite imperforate wall portions 147 and 149 of the front wall 109.

I claim:

1. A digital compact tape cassette which is physically interchangeable in a magnetic tape apparatus with an analog compact cassette of the type having a pair of main walls having a thickness measured across its major walls of about 8.6 mm over a major portion of its housing, the major walls of the analog cassette further including a thickened, front part which defines a front opening, centered with respect to the main walls, for receiving a pressure roller of the magnetic tape apparatus, the front opening having a dimension transverse to the main walls of about 9.6 mm through which the pressure roller of the apparatus is received when a portion of a main wall of the analog cassette other than the thickened part is in registry with a reference surface of the apparatus, said digital compact cassette comprising:

a housing having first and second parallel main walls and transverse walls interconnecting said main walls, one of said transverse walls defining a cassette front wall and having two pressure-roller openings and one magnetic-head opening, and a sliding cover including a front portion opposite said front wall of said housing and first and second main wall portions adjoining said front wall portion and overlying a respective one of said main walls of said housing, said sliding cover being slidable along said front and main walls of said housing between a closed position and an open position, said sliding cover having a magnetic-head aperture and a pressure-roller aperture arranged such that in the closed position said sliding cover covers said openings in said front wall of said housing and in the open position said sliding cover exposes said openings in said front wall of said housing, said first main wall portion of said sliding cover being imperforate in the region adjacent said front wall portion of said sliding cover, said digital cassette having a thickness measured across both main wall portions of the sliding cover, at least at the area of said front opening, of at least 9.5 mm, said pressure roller aperture extends into said second main wall portion of said sliding cover and not into said first main wall portion, and said main wall portions of said sliding cover having a thickness selected such that, in said open position of said sliding cover, the pressure roller of the magnetic tape apparatus, which is receivable in the 9.6 mm front opening of the analog tape cassette, is received in said pressure roller opening of said digital cassette housing when a said main wall of said digital cassette housing is in registry with the same said reference surface of the magnetic tape apparatus.

2. The digital compact tape cassette according to claim 1, wherein each of said main wall portions of said sliding cover have a thickness of about 0.4 mm.

3. The digital compact tape cassette according to claim 2, wherein said sliding cover is constituted by a one-piece metallic sheet.

4. The digital compact tape cassette according to claim 3, wherein said front wall portion of said sliding cover has a width dimension extending parallel to said main walls in the direction of sliding of said cover, and said front portion includes a stiffening strip extending the width of said sliding cover parallel to and adjacent said one of said main wall portions, and said apertures of said front wall portion do not extend into said stiffening strip.

5. The digital compact tape cassette according to claim 4, wherein said second main wall portion of said sliding cover, into which said pressure roller aperture extends, overlies the main wall of the housing which registers against the reference surface in the apparatus when the pressure roller is received in said pressure roller openings of said digital cassette.

6. The digital compact tape cassette according to claim 1, wherein said front wall portion of said sliding cover has a width dimension extending parallel to said main walls in the direction of sliding of said cover, and said sliding cover includes a stiffening strip extending the width of said sliding cover parallel to and adjacent said one of said main wall portions, and said apertures of said front wall portion do not extend into said stiffening strip.

7. The digital compact tape cassette according to claim 6, wherein said main wall of said housing which is overlied by said second main wall portion of said sliding cover, into which said pressure roller aperture extends, comprises drive spindle openings for receiving drive spindles of the tape apparatus, and said second main wall portion of said sliding cover includes a drive spindle aperture positioned so that said sliding cover covers said drive spindle openings in said main wall in the closed position of said sliding cover and said drive spindle aperture uncovers one of said drive spindle openings in the open position of said sliding cover.

8. The digital compact tape cassette according to claim 7, wherein said sliding cover is recessed so as to be flush with said housing, and said cassette has a substantially uniform thickness of about 9.6 mm at least along said front wall and the transverse walls which adjoin said front wall.

9. The digital compact tape cassette according to claim 8, wherein said second main wall portion of the sliding cover, into which said pressure roller aperture extends, corresponds to the main wall of the housing which registers against the reference surface in the apparatus when the pressure roller is received in said pressure roller openings of said digital cassette.

10. The digital compact tape cassette according to claim 1, wherein said main wall of said housing which is overlied by said second main wall portion of said sliding cover, into which said pressure roller aperture extends, comprises drive spindle openings for receiving drive spindles of the tape apparatus, and said second main wall portion of said sliding cover includes a drive spindle aperture positioned so that said sliding cover covers said drive spindle openings in said main wall in the closed position of said sliding cover and said reel drive aperture uncovers one of said reel drive openings in the open position of said sliding cover.

11. The digital compact tape cassette according to claim 1, wherein said sliding cover is constituted by a one-piece metallic sheet.

12. The digital compact tape cassette according to claim 1, wherein said sliding cover is recessed so as to be flush with said housing, and said cassette has a substantially uniform thickness of about 9.6 mm at least along said front wall and the transverse walls of which adjoin said front wall.

13. A magnetic tape cassette adapted for receiving a pressure roller having a major dimension of less than about 9.6 mm, said tape cassette comprising:

a) a housing having first and second parallel main walls and a front wall including a pressure-roller opening, said pressure roller opening extending into both of said main walls;

b) a sliding cover including a front portion opposite said front wall of said housing and main wall portions adjoining said front wall portion and overlying said main walls of said housing, said sliding cover being slidable along said walls of said housing between a closed and an open position, said sliding cover having a pressure-roller aperture arranged such that in the closed position said sliding cover covers said pressure-roller opening in said front wall of said housing and in the open position said sliding cover exposes said pressure roller opening, one of said main wall portions of said sliding cover is smaller than the other main wall portion and is completely imperforate, said pressure-roller aperture in said front wall portion extends into the other of said main wall portions of said sliding cover, said walls of said housing include recesses such that said sliding cover is flush with said housing, said cassette has a uniform thickness of at least 9.5 mm, measured across said major wall portions of said sliding cover and across the non-recessed portions of said main wall of said housing, and said major wall portions have a thickness selected such that, with said sliding cover in said open position, a pressure-roller having a major dimension of less than about 9.6 mm is received in said pressure roller opening of said housing and extends from adjacent said one imperforate main wall portion to at least said pressure roller aperture in the other of said main wall portions of said sliding cover.

14. The digital compact tape cassette according to claim 13, wherein each of said main wall portions of said sliding cover have a thickness of about 0.4 mm.

15. The digital compact tape cassette according to claim 14, wherein said sliding cover is constituted by a one-piece metallic sheet.

16. The digital compact tape cassette according to claim 13, wherein said front wall portion of said sliding cover has a width dimension extending parallel to said main walls in the direction of sliding of said cover, and said front portion includes a stiffening strip extending the width of said sliding cover parallel to and adjacent said one of said main wall portions, and said apertures of said front wall portion do not extend into said stiffening strip.

17. The digital compact tape cassette according to claim 16, wherein said second main wall portion of said sliding cover, into which said pressure roller aperture extends, overlies the main wall of the housing which registers against the reference surface in the apparatus when the pressure roller is received in said pressure roller openings of said digital cassette.

18. The digital compact tape cassette according to claim 13, wherein said main wall of said housing which is overlied by said second main wall portion of said sliding cover, into which said pressure roller aperture extends, comprises drive spindle openings for receiving drive spindles of the tape apparatus, and said second main wall portion of said sliding cover includes a drive spindle aperture positioned so that said sliding cover covers said drive spindle openings in the closed position of said sliding cover and uncovers one of said drive spindle apertures in the open position of said sliding cover.

19. A magnetic tape cassette adapted for receiving a pressure roller having a predetermined major dimension, said tape cassette comprising:

a) a housing having first and second parallel main walls and a front wall including a pressure-roller opening, said pressure roller opening extending into both of said main walls;

b) a sliding cover including a front portion opposite said front wall of said housing and main wall portions adjoining said front wall portion and overlying said main walls of said housing, said sliding cover being slidable along said walls of said housing between a closed and an open position, said front wall portion of said sliding cover having a pressure-roller aperture arranged such that in the closed position said sliding cover covers said pressure-roller opening in said front wall of said housing and in the open position said sliding cover exposes said pressure roller opening, one of said main wall portions of said sliding cover being imperforate in the region of said pressure roller aperture, said pressure-roller aperture in said front wall portion extending into the other of said main wall portions of said sliding cover, and said main wall portions have a thickness selected such that, with said sliding cover in said open position, a pressure-roller having said predetermined major dimension is received in said pressure roller opening of said housing and extends from adjacent said one imperforate main wall portion to at least said pressure roller aperture in the other of said main wall portions of said sliding cover.

* * * * *